March 20, 1962   C. W. HUGHES   3,026,072
INSTRUMENT PANEL STRUCTURE FOR SKY DIVERS
Filed July 23, 1959
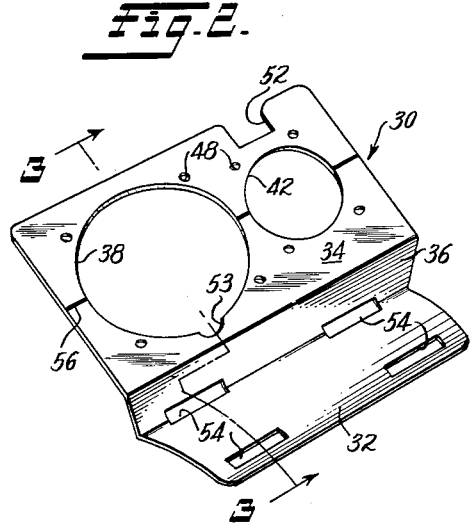
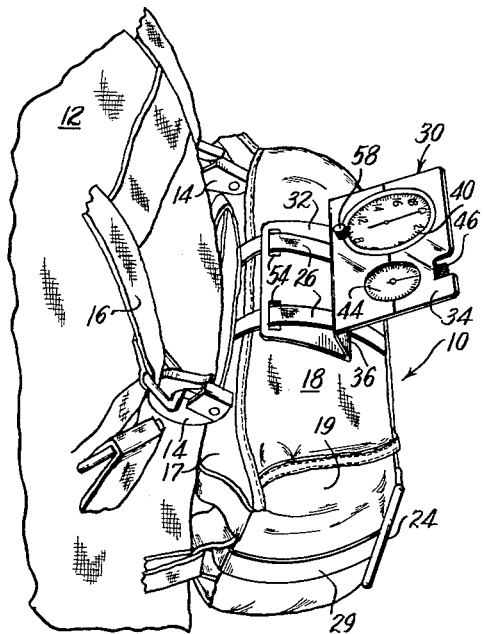
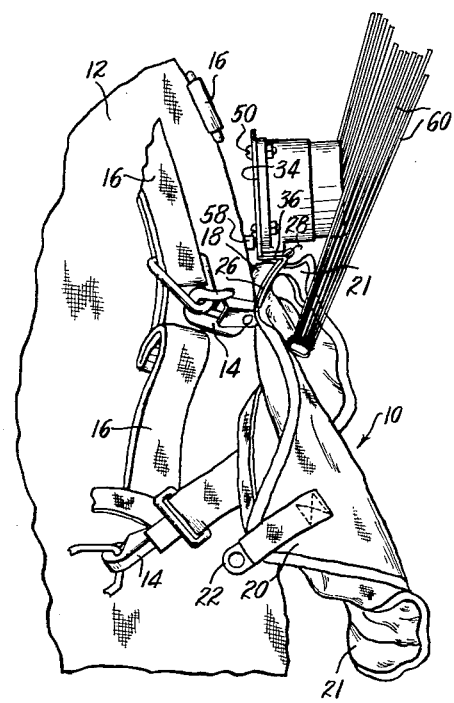
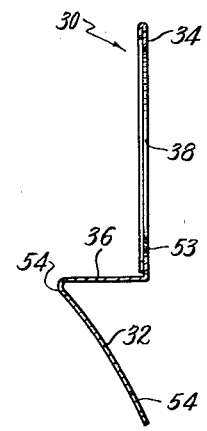
INVENTOR.
Curtis W. Hughes
BY Bacon & Thomas
ATTORNEYS United States Patent Office 3,026,072
Patented Mar. 20, 1962

3,026,072
INSTRUMENT PANEL STRUCTURE FOR SKY DIVERS
Curtis W. Hughes, 4917 D. Schmidt St., Fayetteville, N.C.
Filed July 23, 1959, Ser. No. 829,051
14 Claims. (Cl. 244—148)

This invention relates to a novel instrument panel structure for sky divers, and more specifically to a novel instrument panel structure adapted to mount instruments associated with sky diving, such as an altimeter and a stop watch, and the connection of such a panel to a parachute container.

The term "sky diving" describes maneuvers executed by a parachutist during free fall prior to the opening of the parachute, and the term "sky divers" refers to parachutists engaging in such maneuvers.

Such maneuvers include free falling for predetermined timed intervals, involving the use of various instruments such as an altimeter and a stop watch to enable the sky diver to determine the distance of free fall and the duration thereof prior to pulling the ripcord to release the parachute. It is important that these instruments be mounted in a position on the sky diver where they can be easily read and reached for manual operation, yet not to interfere, in any way, with the maneuvering of the sky diver or with the operation of the parachutes.

It is an object of the invention, therefore, to provide a novel instrument panel structure adapted to be carried by a sky diver which can be supported on the upper side of a parachute container within focal range of the sky diver.

It is a further object of the invention to provide a novel instrument panel structure which can be attached to the upper side of a reserve parachute container, in front of the sky diver, and which attachment does not interfere with the opening of the top flap of the container to release the parachute or with the shroud lines of the parachute when opened.

It is a still further object of the invention to provide a novel instrument panel structure including a resilient connection between the base and panel to protect the instruments from damage due to shock.

It is a still further object of the invention to provide a novel instrument panel having openings to expose the faces of a plurality of instruments and a cutaway portion to facilitate operation of the instruments.

Further objects of the invention are obvious from a consideration of the following description of a preferred embodiment of the invention, reference being made to the accompanying drawing in which:

FIG. 1 is a perspective view of an instrument panel structure as mounted on a reserve parachute container worn in front of a sky diver;

FIG. 2 is a perspective view of the instrument panel structure of FIG. 1, omitting the instruments, and drawn to a larger scale;

FIG. 3 is a longitudinal section through the instrument panel structure taken on the plane 3—3 of FIG. 2; and, FIG. 4 is a perspective view of the instrument panel structure showing the position it assumes when the parachute is open.

Referring to FIG. 1, the numeral 10 designates a reserve parachute container generally carried in front of a sky diver 12, being fastened abutting the lower part of the chest by means of hook fasteners 14 to conventional parachute harness 16 worn by the sky diver.

The reserve parachute container 10 includes a body member having a back wall 17, end walls 19, top wall 18, a bottom wall, a pair of flaps 21 forming extensions of the top and bottom walls, and a pair of end flaps 20 forming extensions of the end walls 19. When the parachute is packed within the container 10, the end flaps 20 and the flaps 21 are brought together in overlapping relation over the folded parachute to form a front closure wall, and secured together by means of cooperating separable connecting means 22, one of which is shown in FIG. 4. These connecting means cooperate with a rip cord 24, which may be pulled by the parachutist to release the parachute, as is well known in the art. The above described structure is conventional, the details thereof forming no part of the present invention.

When the parachute is packed within the container 10, in the manner shown in FIG. 1, the top flaps 21 and the end flaps 20 are fastened together at their free ends, that is, those ends remote from the top and bottom walls and end walls of which they form extensions. A pair of parallel, elastic, pack opening bands 26 are connected to the flaps 21 by means of hook and eye fasteners 28. The opposite ends of these opening bands are secured to the free ends of the two top flaps, and thereby assure the positive opening or separation of the top flaps when the rip cord is pulled. Another transversely extending elastic pack opening band 29 is similarly connected to the free ends of the end flaps 20.

It should be noted, with reference to FIG. 1, that the outer surface of the top wall 18 is convex in form.

The invention, as shown in the drawings, comprises an instrument panel structure 30, having a base 32, a planar instrument panel 34, and a resilient connecting member 36. The base 32 includes a pair of opposed forward and rearward edges, and, as shown in FIG. 3, is somewhat circular in a cross section normal to at least one of said edges, conforming generally to the convex surface of the top wall 18. The resilient connecting member 36, which may be integral with the base 32 and the instrument panel 34, extends at substantially a right angle with reference to the plane of the face of the instrument panel 34, and is arranged to form an acute angle with the adjacent edge of the base 32. By virtue of this arrangement, the plane of the instrument panel 34, as shown in FIG. 1, is disposed at an acute angle relative to a plane including the base edges and is substantially normal to the line of vision of the parachutist or sky diver 12 when disposed with the base resting on the top wall of the container 10.

In this position, with the base 32 supported on the outer surface of top wall 18, the instrument panel 34 and the instruments mounted thereon are within the focal distance of the eyes of the sky diver 12, and lie in a plane normal to the line of sight.

Referring to FIG. 2, the instrument panel 30 is provided with a large opening 38 for receiving an altimeter 40 and with a small opening 42 for receiving a stop watch 44. These openings are of the proper size to receive the face or indicating portions of these instruments, and are surrounded by a plurality of openings 48 for receiving bolts or screws 50 passing through the instrument panel and engaging supporting means for the altimeter and the stop watch mounted on the back face of the instrument panel. The stop watch 44 is provided with a conventional stem 46 for winding, starting, and stopping, and the instrument panel is cut away at 52 about the stem and the reset button, not shown, to form a recess in the upper edge of the instrument panel to facilitate manual operation of the stem and the reset button. The lower part of the opening 38 is cut away at 53 to form a recess to accommodate the reset button 58 of the altimeter 40.

The openings 38 and 42 are formed in side-by-side relation and are aligned so that their transverse diameters are aligned with a medial band 56 on the surface of the instrument panel which makes it easier for the sky diver to focus his eyes on either or both instruments. The base 32 is provided with two pairs of aligned and spaced slots 54, through which pass the elastic-pack opening bands 26, serving to retain the instrument panel structure 30 in position on the reserve parachute container 10 as shown in FIG. 1.

It is evident, from the foregoing, that the structure described above will be maintained in position within the focal length of the eyes of the sky diver during his free fall and also during his drop after the parachute carried on the back of the sky diver, not shown, has been opened. By such arrangement the sky diver, during his fall, may observe the altitude as indicated on the altimeter 40, and by starting the stop watch 44 at the instant of his drop by pressing the exposed stem 46, can determine the duration of the free fall and/or the total fall.

Should it become necessary for the sky diver to release the reserve parachute within the container 10, the ripcord 24 may be pulled in the usual manner, permitting the top flaps 21 and end flaps 20 to be released, whereupon the elastic bands 26 and 29 become effective to positively withdraw the top flaps and the end flaps and to release the reserve parachute. As shown in FIG. 4, in which the reference numeral 60 designates the parachute shroud lines, the top wall 18 and one of the top flaps 21 are thrown toward the chest of the sky diver 20 so that the instrument panel 34 is brought to a position close to the chest of the sky diver. The resilient connection 36 is effective to cushion the shock and prevent damage to the delicate instruments carried on the panel 34. In this position, the panel is out of the path of deployment of the parachute, which cannot become entangled with the panel.

It is evident from the foregoing that a very effective instrument panel structure has been devised, which is easily fitted on conventional reserve parachute container structure, requiring no alteration or modification thereof, and which can be easily and quickly mounted and dismounted, and which, when so mounted, is carried in a position within the focal distance of the sky diver, without interfering in any manner with the release of the reserve parachute.

It will be understood that various changes may be made in the details of construction and in the arrangement of the parts disclosed herein without departing from the principles of the invention and the scope of the annexed claims.

I claim:

1. An instrument panel structure for sky divers comprising a base having a front edge and a rear edge, an instrument panel having at least one instrument opening formed therein and having a free upper edge and a lower supporting edge, said instrument panel comprising a planar member disposed in a plane forming an acute angle with the general plane of said base in the region beyond said lower edge, and a resilient member extending substantially at a right angle to the instrument panel connecting the supporting edge of said instrument panel with one edge of said base.

2. An instrument panel structure for sky divers as recited in claim 1, in which the resilient member is integral with the rear edge of the base.

3. An instrument panel structure for sky divers as recited in claim 1, in which a cross-section through the base corresponds to an arc of a circle having an upward bow.

4. An instrument panel structure for sky divers as recited in claim 3, in which a plurality of slots, disposed in parallel fore and aft rows, are provided in the base for receiving pack opening bands of a parachute container.

5. An instrument panel structure for sky divers as recited in claim 1, in which the instrument panel includes a plurality of symmetrical, side-by-side, openings for exposing the faces of a plurality of instruments, said openings having different areas, the transverse diametral lines of said openings coinciding.

6. An instrument panel structure for sky divers as recited in claim 5, in which one of said openings is adapted to receive an instrument having a laterally extending, manually actuated stem, including a cutaway portion along one edge of said instrument panel adjacent said one opening to facilitate access to said stem.

7. In combination, a reserve parachute container, adapted to be worn in front of a sky diver abutting the lower part of the chest, said container having flap covers forming, when enclosing a folded parachute, a top wall, a bottom wall, and a pair of end walls, said flap covers including flaps adapted to be brought together in overlapping relation to form a front closure wall facing the same direction as the parachutist and held in closed position by a ripcord, said flap covers being opened by withdrawal of the ripcord to release a reserve parachute, and an instrument panel structure comprising a base having a front edge and a rear edge, an instrument panel having openings, and having a free upper edge and a lower supporting edge, said instrument panel carrying instruments having indicators lying generally in the plane thereof and visible through said openings, said instrument panel being in the form of a planar member disposed in a plane forming an acute angle with that of said base and connected therewith, means securing said panel structure to the top wall of the container with the base resting on the top wall and the instrument panel disposed with its plane generally normal to the line of sight and within focal distance of a parachutist when the flap covers are closed, whereby said top wall and said instrument panel structure are pivoted against the chest of the parachutist and out of the path of deployment of the parachute when released.

8. The combination as recited in claim 7, in which the top wall of the container, when enclosing a parachute, is generally of convex contour, and in which said base is a base of curvilinear form conforming generally to the contour of the top wall of the container when the flaps are in closed position.

9. The combination as recited in claim 7, in which said flap covers have resilient pack opening bands, and said base includes means cooperating with said bands to secure the instrument panel structure to said container.

10. The combination as recited in claim 9, in which said securing means comprises a plurality of slots through which the pack opening bands pass.

11. The combination as recited in claim 7, in which the instrument panel structure includes a resilient member connecting the base and the panel.

12. An instrument panel structure for use by a sky diver in association with a parachute container, comprising: a base portion having opposed longitudinal edges, said base portion being arcuate in transverse cross-section and bowed upwardly; and an upstanding planar panel forming an extension of said base portion and having a lower edge joined with one of said base edges, said panel containing openings for mounting instruments therein and having a plurality of holes spaced about said openings to receive fasteners for securing said instruments to said panel, said base portion having openings for means to secure the base portion to the top portion of a parachute container, the plane of said panel being disposed on an acute angle relative to the general plane of said base portion in the region beyond said lower edge of said panel, whereby, when in use, said panel will lie substantially normal to the line of vision of the sky diver.

13. An instrument panel structure as defined in claim 12, in which one of the instrument openings is of a size to receive a stop watch having a reset button, and wherein the upper edge of the panel has a portion thereof cut away above said one opening to provide a recess to receive the reset button of said stop watch.

14. An instrument panel structure for use by a sky diver in association with a parachute container, comprising: a base portion having spaced longitudinal edges, said base portion being arcuate in transverse cross-section and bowed upwardly; and an upstanding planar panel forming an extension of said base portion having a lower edge joined with one of said base edges, said panel containing respective openings for mounting an altimeter and a stop watch therein, said panel also having holes surrounding said openings to receive fasteners for securing said altimeter and stop watch to said panel, said base portion having slots through which straps can pass for securing the same to the top portion of a parachute container, the plane of said panel being disposed on an acute angle relative to the general plane of said base portion in the region beyond said lower edge of said panel, whereby, when in use, said panel will be substantially normal to the line of vision of the sky diver.

References Cited in the file of this patent

UNITED STATES PATENTS

| | | |
|---|---|---|
| 1,036,539 | Baile | Aug. 27, 1912 |
| 1,045,227 | Wells | Nov. 26, 1912 |
| 1,053,749 | Stebbins | Feb. 18, 1913 |
| 1,273,448 | Berg | July 23, 1918 |
| 1,498,601 | Zipay | June 24, 1924 |
| 2,227,626 | Blila | Jan. 7, 1941 |

OTHER REFERENCES

Aviation Week Magazine, Nov. 19, 1956, vol. 65, No. 21, page 99 relied upon.